United States Patent [19]

Twite et al.

[11] 4,290,266

[45] Sep. 22, 1981

[54] ELECTRICAL POWER GENERATING SYSTEM

[76] Inventors: Terrance M. Twite, Shellhorn; Wilmer S. Huston, both of Brownsville, Minn. 55919

[21] Appl. No.: 72,125

[22] Filed: Sep. 4, 1979

[51] Int. Cl.³ .............................................. F03G 7/00
[52] U.S. Cl. ..................................... 60/641.2; 165/45; 165/108; 165/163; 165/104.21
[58] Field of Search .................... 60/641; 165/45, 106, 165/108, 159, 160, 163

[56] References Cited

U.S. PATENT DOCUMENTS

| | | | |
|---|---|---|---|
| 3,274,769 | 9/1966 | Reynolds | 165/45 |
| 3,448,792 | 6/1969 | Lawrence | 165/108 X |
| 3,470,943 | 10/1969 | Van Huisen | 165/45 |
| 3,857,244 | 12/1974 | Faucette | 60/641 |
| 4,142,108 | 2/1979 | Matthews | 60/641 X |

Primary Examiner—Robert G. Nilson
Attorney, Agent, or Firm—Orrin M. Haugen; Thomas J. Nikolai

[57] ABSTRACT

A geothermal energy system in which a bore hole is drilled into the earth to a depth where a predetermined temperature gradient exists between the earth's surface and the bottom of said bore hole. A liquid refrigerant line passes down the bore hole and connects to an evaporator where the geothermal energy is used to vaporize the refrigerant and from there it passes back up through a high pressure gaseous refrigerant return line to a gas operated turbine located at the earth's surface. The spent refrigerant exiting from the turbine is cooled in a condensing unit and recirculated to the subterranean evaporator unit. The turbine may be used to drive a suitable electrical generator for power production purposes.

4 Claims, 5 Drawing Figures

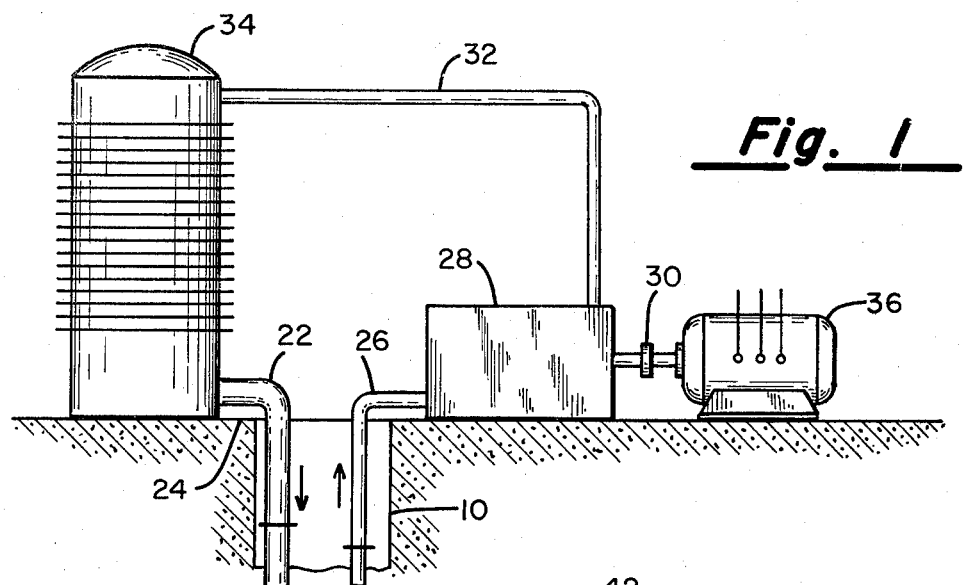
Fig. 1
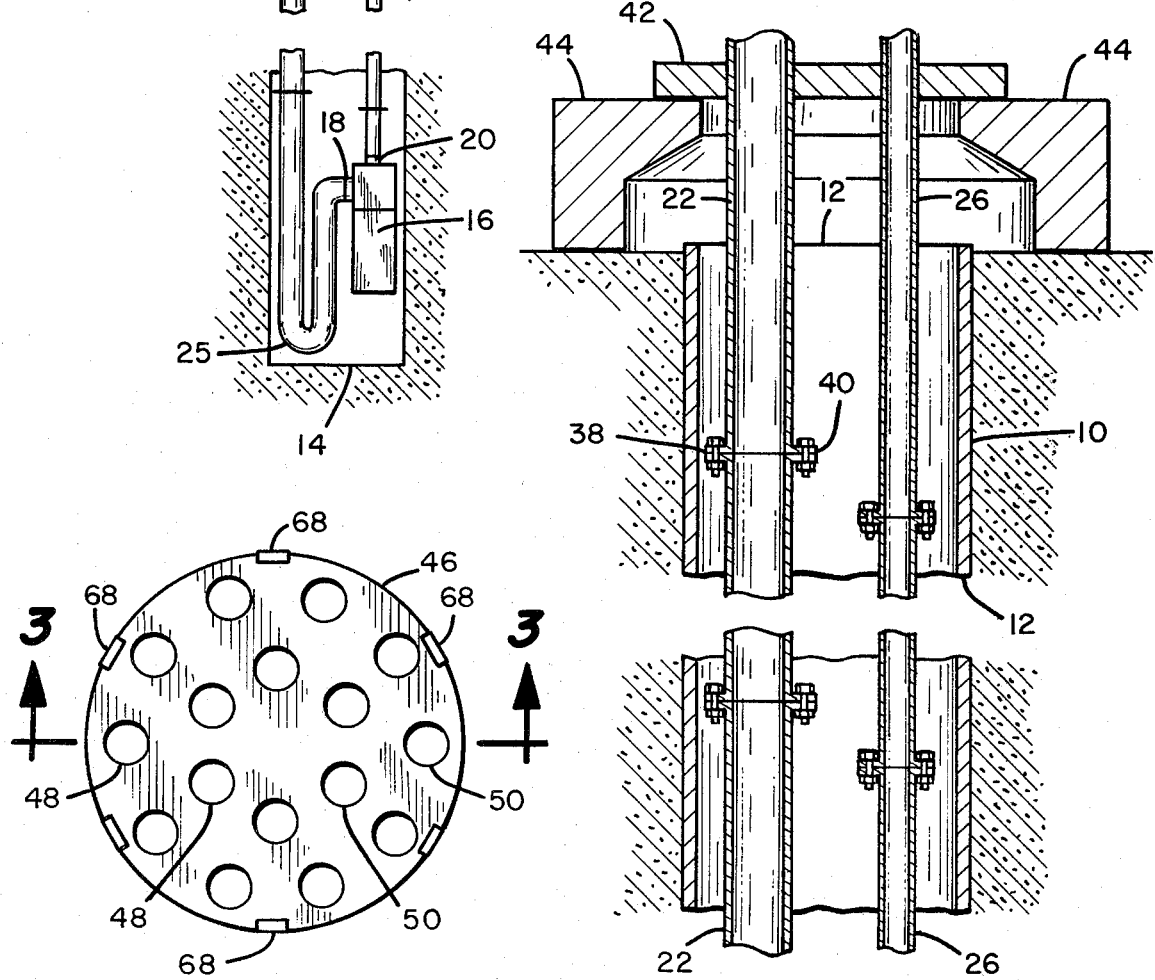
Fig. 4
Fig. 2

ELECTRICAL POWER GENERATING SYSTEM

BACKGROUND OF THE INVENTION

1. Field of the Invention

This invention relates generally to a non-fossil fuel power generating system and more specifically to a passive, geothermal system which utilize the heat energy at predetermined subterranean locations for producing a working fluid suitable for driving a turbine-type prime mover.

II. Discussion of the Prior Art

During the past few years, attention has been focused on alternative sources of energy because of the real or contrived shortages of crude oil and the attendant substantial price increases for that commodity. While scientists and engineers have looked to atomic energy facilities as well as coal consuming systems, a high degree of concern has been expressed by environmentalists over the use of these latter energy systems. Attempts are being made to devise non-polluting energy sources which can be rendered affordable.

It has been known for many years that vast energy resources are stored with the earth's crust in the form of geothermal beds deep within the earth. Again, scientists have determined that the heat energy present within the earth, if properly harnessed, would be sufficient to meet the total energy needs of the world population for many, many centuries. This energy source is potentially non-polluting and modern technology has advanced to the point where it becomes practical to harness this energy in an attempt to solve the world's increasing energy demands.

For example, modern drilling techniques developed for recovery of oil and gas deposits makes it possible to form a bore hole into the earth for substantial distances. It is now possible to drill several miles into the earth and it is found that at such depths there is a significant temperature gradient relative to the ambient temperature at the earth's surface. In attempts to recover this heat, several prior art processes have been tried. For example, systems wherein water is injected into the bore hole and later pumped out either as hot water or steam have been tried. The equipment needed to accomplish this task tends to be quite costly and, further, contaminants picked up by the water tend to create damage to the equipment requiring frequent periodic maintenance, flushing, etc. Also, the fact that energy must be expended in moving the fluid detracts from the overall efficiency of the generating system.

SUMMARY OF THE INVENTION

In accordance with the teachings of the present invention, the geothermal recovery system employs a hermetically sealed, closed loop refrigeration system in which an evaporator unit in the form of a plurality of refrigerant lines is disposed at a predetermined point beneath the earth's surface where the temperature gradient is sufficient to produce significant power output. A liquid refrigerant, such as Freon, is fed downward through a suitable conduit to the evaporator zone and the geothermal heat acts upon the refrigerant to convert it into a gas under relatively high pressure. The output from the evaporator is then coupled through a conduit passing upward through the bore hole to an energy utilization device, such as a gas driven turbine, located on the earth's surface. The refrigerant exiting from the turbine, after it has been used to drive the turbine blades, is passed through a condenser unit where the refrigerant is returned to a cooled liquid state for recirculation to the subterranean evaporator. By using a Freon-type refrigerant which possesses the property of readily passing between the liquid and gaseous state at somewhat moderate temperatures, the need for extensive pumping apparatus for circulating the refrigerant through the system is obviated. That is to say, the weight of the liquid refrigerant allows it to flow under the force of gravity to the bottom of the bore hole and into the evaporator unit. The energy absorbed from the surrounding geothermal supply converts the refrigerant to a low density, high pressure gas and it is forced upward to the turbine without the need for pressure increasing pumps or the like.

The use of the present system therefore portends a relatively maintenance free, non-polluting method and apparatus for generating useful energy at the earth surface, taking advantage of the vast supply of geothermal energy present in the earth.

OBJECTS

It is accordingly the principal object of the present invention to provide a new and improved system for generating useful power for satisfying, at least in part, the world's increasing demand for energy.

Another object of the invention is to provide a non-polluting, relatively low cost, system for extracting energy from subterranean sources within the earth.

Yet another object of the invention is to provide a closed cycle energy recovery system wherein a liquid refrigerant is supplied to a subterranean evaporator unit heated by geothermal energy whereby the refrigerant is converted to a gas for use at the earth's surface in driving a prime mover.

These and other objects and advantages of the present invention will become apparent to those skilled in the art from the following detailed description of a preferred embodiment when considered in conjunction with the accompanying drawings in which like numerals in the several views refer to corresponding parts.

DESCRIPTION OF THE DRAWINGS

FIG. 1 is a schematic representation of a geothermal energy generating system;

FIG. 2 is a cross-sectional view showing the manner in which the conduits used in the system of FIG. 1 may be constructed in a bore hole;

FIG. 4 is a top plan view of the header member; and

DESCRIPTION OF THE PREFERRED EMBODIMENT

Figure 5:
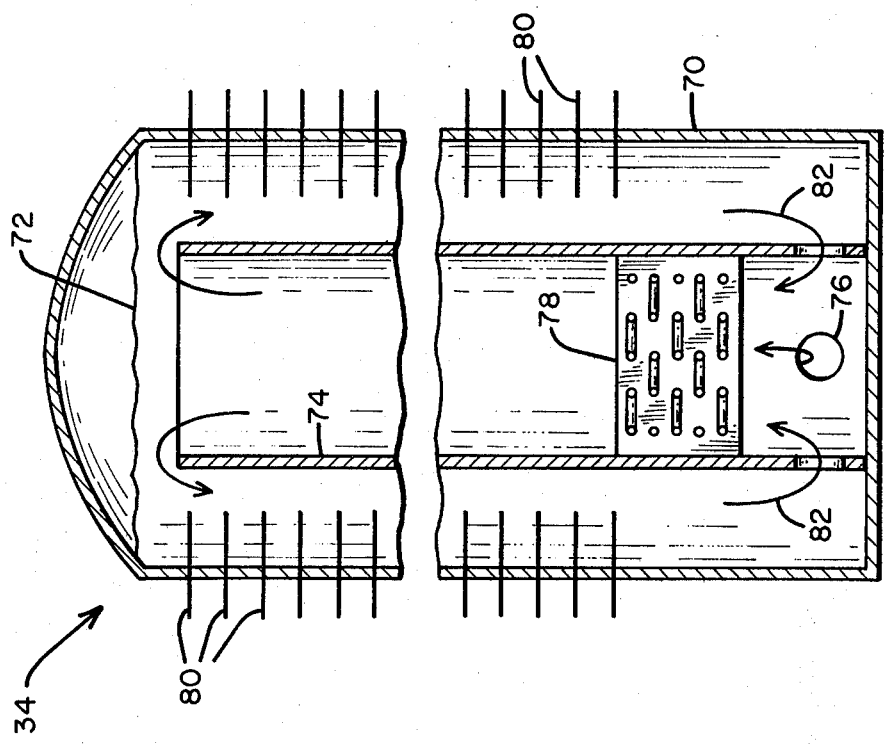
FIG. 5 is a cross-sectional view of the condenser unit.

Referring to the schematic diagram of FIG. 1, there is shown a bore hole 10 which may contain a well casing 12 (FIG. 2) and which extends a predetermined distance in the range of from 100 feet to 30,000 feet depending upon the geology of the area at which the power producing station is to be constructed. That is to say, there is a considerable variation over the surface of the earth as to the depth that one must drill in order to attain a desired temperature differential between the earth's surface and a desired geothermal working temperature.

Disposed proximate the bottom 14 of the bore hole 10 is an evaporator unit 16 having a liquid inlet port 18 and a gas outlet port 20 formed therein. A liquid refrigerant line 22 extends from the earth's surface 24 to the liquid refrigerant inlet port 18 by way of a loop 25 of a predetermined length, e.g., 100 feet, which extends below the level of the evaporator inlet port 18 and functions as a liquid refrigerant trap. A conduit 26 extends from the gas outlet port 20 back to the earth's surface 24. The outlet of the gas conduit 26 is coupled to a gas driven turbine 28 of a conventional design and the high pressure gas refrigerant flowing in the line 26 is used to drive its impellers which, in turn, drive the output shaft 30 thereof. The spent refrigerant, after passing through the turbine 28 is collected and passed via the conduit 32 to a condenser unit 34 where, again, the refrigerant is restored to a cooled liquid state. The output shaft 30 of the turbine may be coupled to the shaft of an electrical generator 36 whereby electrical power may be generated for distribution through known power transmission systems.

The liquid refrigerant exiting from the condenser unit 34 being quite dense falls under the force of gravity through the conduit 22 to the inlet of the evaporator unit. Once the refrigerant becomes heated through the absorption of the geothermal energy promimate the evaporator unit 16, the refrigerant media becomes significantly less dense and a substantial pressure is created within the evaporator unit 16 for forcing the gaseous refrigerant back up through the conduit 26 to the inlet of the turbine unit 28. As such, little or no auxiliary pumping apparatus is required to elevate the refrigerant from the base of the bore hole.

Referring next to FIG. 2, there is shown a cross-sectional view which illustrates the manner in which the evaporator unit may be installed within the well casing 12 and made to descend to the bottom thereof. It further shows the manner in which the weight of the assembled unit may be supported. With reference to this figure, it can be seen that the liquid refrigerant conduit 22 is formed from pipe segments of predetermined length which are joined together as at 38 by annular flanges 40 formed at each end of the conduit segment. Alternatively, if deemed to be economically feasible, adjacent pipe segments may be joined by welding to ensure a hermetic seal.

The evaporator unit 16 is dimensioned so as to fit within the well casing 12 and is lowered by sequentially attaching further segments as it is lowered down into the bore hole. Once a sufficient number of pipe segments have been coupled end-to-end such that the evaporator unit 16 has been lowered to the desired site within the earth's crust or mantle, a cylindrical plate 42 may be welded or otherwise affixed to the liquid refrigerant conduit 22 and the gaseous refrigerant conduit 26. The plate 42 is adapted to rest upon suitable support pillars 44 which may be formed from concrete, steel or other suitable material.

Figure 3:
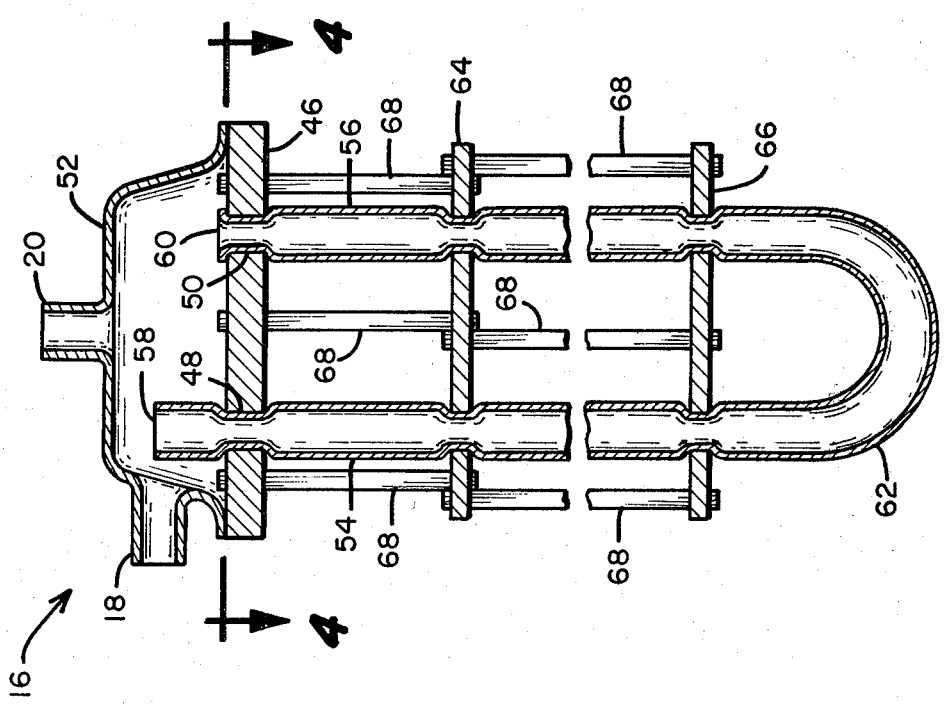
FIG. 3 is a cross-sectional view of a subterranean evaporator unit useful in the system of FIG. 1.

With reference to FIGS. 3 and 4, consideration will now be given to the design of a preferred form of evaporator unit suitable for installation at the base of a bore hole and allowing geothermal energy to effect a conversion of a suitable refrigerant, e.g., Freon, from its liquid to its gaseous state. FIG. 3 is a side cross-sectional view of the evaporator unit and it shows a generally circular header plate 46 which is preferably formed from a non-ferrous, acid resistant, nickel based alloy such as monel having a pattern of openings therein as at 48 and 50. The header 46 is dimensioned to fit within the bore hole casing 12 and, typically, may have an outer diameter of 1 foot or less. Secured to the upper planar surface of the header 46 is a dome 52 into which extends the liquid refrigerant inlet port 18 and which also includes the gaseous refrigerant outlet port 20. The dome 52 is suitably hermetically sealed to the surface of the header plate 46 at the periphery thereof. Passing through the apertures 48 and 50 in the header plate are first and second sets of tubular members such as 54 and 56. The tube 54 is open at its upper end 58 which extends a predetermined distance above the upper surface of the header plate 46. The tubular member 56 is also open at its upper end 60, but this end is generally flush with the upper surface of the header plate 46. Hence, the ends 58 and 60 of the tubular members 54 and 56 are at different elevations as can clearly be seen in the view of FIG. 3.

The tubular members 54 and 56 are of a predetermined length which may, for example, be about 100 feet, and are joined one to the other by an intermediate loop 62. While only one such pair of joined tube members are illustrated, as is suggested by the top view of the header (FIG. 4) several additional tube pairs are also provided, each with open upper ends at differing elevations and their respective lower ends joined by U-shaped segments such as 62 in FIG. 3.

The tubular members 54 and 56 are preferably supported in the header plate 46 by being swaged to a larger diameter than that of the apertures 48–50 after having been passed through such apertures. In a similar fashion, additional support for the elongated tubular members 54 and 56 can be provided by including additional tube support plates as at 64 and 66. These support plates are of the same general pattern as the header plate 46 but are of a reduced thickness and are spaced longitudinally one from the other as the strength of materials and other factors may dictate.

The tube support plates 64 and 66 are preferably suspended from the header plate 46 by means of elongated straps 68 which are welded or otherwise affixed between adjacent tube support plates in the fashion illustrated.

Hence, when fully assembled, the elongated evaporator unit comprises a plurality of U-shaped tubular segments which are closely clustered and suspended from a header plate and maintained in a spaced apart relationship by intermediate tube support plates. Being suspended one from the other by means of straps, the evaporator unit is fully exposed to the temperatures existing proximate the bottom of the bore hole. In use, the liquid refrigerant flows into the port 18 formed in the dome 52 and because of the difference in elevation between the ends 58 and 60 of the tube pairs 54 and 56, the liquid refrigerant will flow by gravity down into the tube 56. The relatively high geothermal temperature existing at the base of the bore hole will cause the refrigerant to vaporize and the resulting gas, under relatively high pressures, will rise through the tubular member 54 and will exit from the elevated upper end 58 of this tube. The gaseous refrigerant exiting from all of the tubes will be collected in the dome 52 and will exit the outlet port 20.

Referring now to FIG. 5, there is shown the preferred form of a condenser unit for cooling the spent refrigerant after it has performed its useful intended work in driving the turbine unit 28 (FIG. 1). As is shown in the cross-sectional view of FIG. 5, the condenser unit includes a sealed tank 70 which is adapted to be filled with a suitable liquid coolant, such as water, to a level as indicated at 72. Contained within the tank 70 is a generally cylindrical stack 74 which is provided with plural ports 76 located proximate the base thereof. The stack 74 is generally concentric within the tank 70 and disposed therein is a condenser unit indicated generally by numeral 78. The condenser unit comprises a predetermined length of tubing which is coiled so as to provide a significant surface area within a minimum space. The inlet side of the condenser 78 (not shown) is coupled to the conduit 32 (FIG. 1) so as to receive the higher temperature refrigerant. The outlet of the condenser is, in turn, coupled to the liquid refrigerant line 22 which extends down into the bore hole.

Formed through the side walls of the tank 70 are a plurality of cooling fins 80 which provide a significant area in contact with the outside ambient air so that heat conducted from the water within the tank may be conducted through the fins and then carried away. By having the stack 70 within the tank, and by disposing the condenser unit 78 within the stack, good circulation of the coolant results. Specifically, convection currents are established whereby the cooler liquid drops to the bottom of the tank and passes through the apertures 76 as indicated by the arrows 82. In passing through the condenser unit 78, the coolant becomes heated and rises to the top of the stack where it again becomes cooled by exposure to the cooling fins 80 which extend through the side walls of the tank 70. In this fashion, the liquid refrigerant flowing through the coils of the condenser unit 78 is cooled to ensure that it is in its liquid phase prior to being routed back to the evaporator unit 16.

Thus is can be seen that there has been described a geothermal energy power producing system which is highly efficient and which is adapted to functon over relatively long periods of time with little or no attention or maintenance. The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the inventon itself.

What is claimed is:

1. A geothermal power generating system comprising:
   (a) a bore hole extending into the earth to a subterranean location where the temperature is a predetermined desired value;
   (b) an evaporator unit disposed proximate the bottom of said bore hole and having a liquid refrigerant inlet port and a gaseous refrigerant outlet port;
   (c) an elongated U-shaped loop of tubular conduit having one end thereof coupled to said liquid refrigerant inlet port and the bottom of said loop being at a predetermined level below the effective level of said evaporator unit;
   (d) a gas driven turbine unit disposed on the earth's/earth/surface proximate said bore hole and having a high pressure inlet and a lower pressure outlet;
   (e) a condenser unit disposed on the earth's surface proximate said bore hole;
   (f) a first conduit means coupling said condenser unit to the other end of said U-shaped loop of tubular conduit;
   (g) a second conduit means coupling said gaseous refrigerant outlet port of said evaporator unit to said high pressure inlet of said turbine; and
   (h) a third conduit means coupling said lower pressure outlet of said turbine unit to said condenser unit, said evaporator unit, said U-shaped loop, said first, second and third conduit means and said condenser unit all being in a hermetically sealed relationship.

2. The system as in claim 1 wherein said condenser unit comprises:
   (a) a tank member adapted to contain a predetermined volume of coolant;
   (b) means passing through the walls of said tank member and into said volume of coolant for removing heat energy therefrom;
   (c) a cylindrical stack disposed generally vertically within said tank member and having openings at its upper and lower ends for receiving and discharging coolant therethrough;
   (d) a predetermined length of tubing having an inlet end and an outlet end, said length of tubing being located internally of said stack; and
   (e) means joining said third conduit means to said inlet end of said length of tubing and said first conduit means to said outlet end of said tubing.

3. A geothermal power generating system comprising:
   (a) a bore hole extending into the earth to a subterranean location where the temperature is a predetermined desired value;
   (b) an evaporator unit disposed proximate the bottom of said bore hole including
      (1) a header plate having a plurality of pairs of apertures extending through the thickness dimension thereof,
      (2) a plurality of generally U-shaped tubes having the ends thereof extending through associated ones of said plurality of pairs of apertures, with one of said ends of each of said U-shaped tubes at a different elevation than the other of said ends relative to the upper surface of said header plate, said header plate supporting said plurality of U-shaped tubes, and
      (3) a dome member surrounding said upper surface of said header plate and sealingly secured thereto and having a liquid refrigerant inlet port and a gaseous refrigerant outlet port;
   (c) an elongated U-shaped loop of tubular conduit having one end thereof coupled to said liquid refrigerant inlet port and the bottom of said loop being at a predetermined level below the effective level of said evaporator unit;
   (d) a gas driven turbine unit disposed on the earth's surface proximate said bore hole and having a high pressure inlet and a lower pressure outlet;
   (e) a condenser unit disposed on the earth's surface proximate said bore hole;
   (f) a first conduit means coupling said condenser unit to the other end of said U-shaped loop of tubular conduit;
   (g) a second conduit means coupling said gaseous refrigerant outlet port of said evaporator unit to said high pressure inlet of said turbine; and (h) a third conduit means coupling said lower pressure outlet of said turbine unit to said condenser unit.

4. The evaporator as in claim 3 and further including:
(a) a plurality of spaced apart tube support plates having a pattern of apertures therethrough corresponding to the apertures passing through said header plate, the legs of said U-shaped tubes extending through said apertures in said tube support plates, said legs being swaged on opposite sides of said tube support plate to an outer diameter greater than the diameter of said apertures in said support plates;
(b) a plurality of strap members suspended between said header plate and said plurality of tube support plates.

* * * * *

UNITED STATES PATENT AND TRADEMARK OFFICE
CERTIFICATE OF CORRECTION

PATENT NO. : 4,290,266

DATED : September 22, 1981

INVENTOR(S) : Terrance M. Twite and Wilmer S. Huston

It is certified that error appears in the above-identified patent and that said Letters Patent are hereby corrected as shown below:

Column 5, line 64, delete "/earth/".

Signed and Sealed this

Twenty-fourth Day of November 1981

[SEAL]

Attest:

GERALD J. MOSSINGHOFF

Attesting Officer   Commissioner of Patents and Trademarks